W. F. MORGAN.
NUT LOCKING DEVICE.
APPLICATION FILED MAR. 10, 1911.

1,015,059.

Patented Jan. 16, 1912.

WITNESSES:

INVENTOR.
W. F. Morgan
BY
ATTORNEYS

UNITED STATES PATENT OFFICE.

WILLIAM F. MORGAN, OF DUQUESNE, PENNSYLVANIA.

NUT-LOCKING DEVICE.

1,015,059. Specification of Letters Patent. Patented Jan. 16, 1912.

Application filed March 10, 1911. Serial No. 613,553.

*To all whom it may concern:*

Be it known that I, WILLIAM F. MORGAN, a citizen of the United States of America, residing at Duquesne, in the county of Allegheny and State of Pennsylvania, have invented certain new and useful Improvements in Nut-Locking Devices, of which the following is a specification, reference being had therein to the accompanying drawing.

This invention relates to nut locks and the objects of my invention are to provide a nut locking device that will positively retain a nut upon a bolt and prevent the accidental displacement of the same, and to provide a nut locking device that can be advantageously used in connection with rail joints, rolling stock, bridges and other structures subjected to vibrations which have a tendency to remove nuts from bolts.

Further objects of my invention are to provide a nut locking device that can be easily and quickly installed without the use of skilled labor, and to provide a nut locking device that can be used in connection with the present type of bolt.

I attain the above objects by a mechanical construction that is simple, durable and inexpensive to manufacture, and the device will be hereinafter specifically described and then claimed.

Reference will now be had to the drawings, wherein:—

Figure 1:
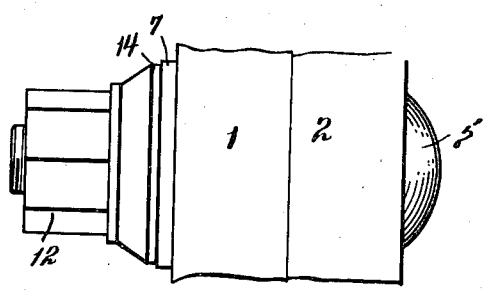
Figure 2:
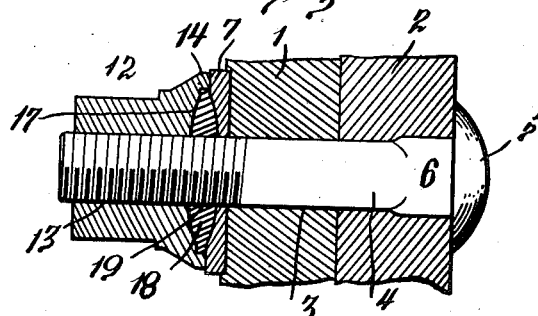
Figure 3:
Figure 6:
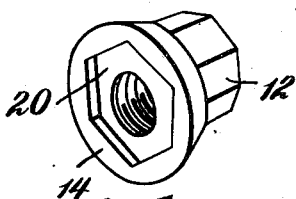
Figure 7:
Figure 4:
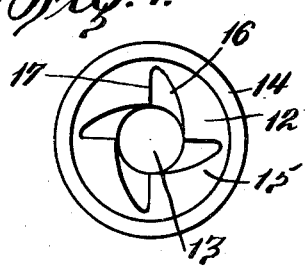
Figure 5:
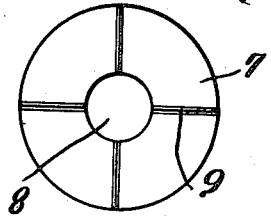

Figure 1 is a side elevation of the nut locking device. Fig. 2 is a longitudinal sectional view of the same. Fig. 3 is a perspective view of a washer forming part of the device. Fig. 4 is an end view of the preferred form of nut. Fig. 5 is a view of the rear side of the washer illustrated in Fig. 3. Fig. 6 is a perspective view of a modified form of nut, and Fig. 7 is a perspective view of a modified form of disk.

The reference numerals 1 and 2 denote, by the way of an example, two pieces of material having registering openings 3 adapted to receive a bolt 4, said bolt having a head 5 and an enlargement 6 engaging the piece of material 2, whereby said bolt cannot rotate relatively to said piece of material. The threaded end of the bolt 4 protrudes from the piece of material 1.

7 denotes a circular washer having an opening 8 adapted to receive the bolt 4. The rear face of the washer 7 is provided with radially disposed ribs 9 adapted to frictionally engage in the piece of material 1 and prevent said washer from rotating relatively to said piece of material. The front side of said washer is cut away, as at 10 to provide radially disposed teeth 11 for a purpose that will presently appear.

12 denotes a nut having a threaded bore 13 adapted to receive the threaded end of the bolt 4 and this nut has the inner end thereof provided with an annular enlargement 14 having a socket 15 with the bottom thereof cut away, as at 16 to provide radially disposed teeth 17.

18 denotes a disk made of rubber, soft lead or other yieldable material. This disk has a central opening 19 to receive the bolt 4 and is interposed between the nut 12 and the washer 7. When the nut 12 is rotated to engage the washer 7 the disk 18 is compressed and the material thereof upset sufficiently to engage the teeth 11 of the washer 7 and the teeth 17 of the nut 12, thereby preventing the nut 12 from rotating relatively to the washer 7, except when a wrench or other instrument is employed.

In Figs. 6 and 7 of the drawings there is illustrated a modification of the invention, wherein the nut 12 has the enlargement 14 thereof provided with a compressible hexagonal shaped socket 20 and adapted to fit in this socket is a compressible hexagonal shaped disk 21 performing a similar function as the disk 18. The socket 20 can be of any desired shape.

While in the drawings there are illustrated the preferred embodiments of the invention it is to be understood that the structural elements thereof are susceptible to such changes as fall within the scope of the appended claim.

What I claim is:—

A nut lock comprising a bolt, a washer having its rear face provided with radially-disposed ribs adapted to enter the material through which the bolt is adapted to pass, said washer having its other face cut away to provide radially-disposed teeth, a nut mounted upon the screw-threaded portion of the bolt and having its inner end provided with an enlargement recessed to provide a socket, the bottom wall of said socket cut-away to provide radially-disposed teeth, and a resilient disk interposed and compressible between said nut and washer, extending into said socket and adapted when compressed to have the front and rear faces thereof embedded in the front face of the washer and the bottom wall of the socket whereby said disk will engage the teeth of the washer and the teeth of the nut, thereby preventing the nut from rotating relatively to the washer.

In testimony whereof I affix my signature in the presence of two witnesses.

WILLIAM F. MORGAN.

Witnesses:
　Max H. Srolovitz,
　Christina T. Hood.